United States Patent [19]

Free et al.

[11] 4,034,339
[45] July 5, 1977

[54] SYSTEM FOR COORDINATION AND DOCUMENTATION OF MATERIAL HANDLING

[75] Inventors: John Marshall Free, Montclair; Charles William Jeunelot, Wayne, both of N.J.

[73] Assignee: Hoffmann-La Roche Inc., Nutley, N.J.

[22] Filed: Apr. 28, 1976

[21] Appl. No.: 681,109

[52] U.S. Cl. .................. 340/146.1 C; 340/147 A; 364/900
[51] Int. Cl.² ........................................ G06F 3/02
[58] Field of Search ......... 235/153 R, 151.1, 151.2; 340/146.1 C, 146.1 R, 172.5, 147 A, 147 LP; 445/1

[56] References Cited
UNITED STATES PATENTS

| | | | |
|---|---|---|---|
| 3,335,407 | 8/1967 | Lange et al. | 340/172.5 |
| 3,596,256 | 7/1971 | Alpert et al. | 340/172.5 |
| 3,774,164 | 11/1973 | Osterberg et al. | 340/172.5 |
| 3,824,544 | 7/1974 | Simjian | 340/147 A |
| 3,936,807 | 2/1976 | Edwards | 340/172.5 |

*Primary Examiner*—Charles E. Atkinson
*Attorney, Agent, or Firm*—Samuel L. Welt; George M. Gould; Mark L. Hopkins

[57] ABSTRACT

Arrangement for coordinating and documenting the handling of material between at least two sites remote from one another, which is useful particularly in inventory control situations and the movement of bulk pharmaceuticals. There is provided at a first site a master data communicator unit whereby an operator may, upon preliminarily addressing the programmable data lock portion of the master unit with the correct code, enter data, for example, alphanumeric data, into the master unit. This information is automatically forwarded to one or more slave units associated with respective slave sites, wherein the information entered at the master unit is continuously displayed on both the master and slave units. The information forwarded to the slave unit is passed through an information distribution control arrangement situated at the master site by which an operator may control the dissemination of the data entered in the master unit to the slave units on a need-to-know basis. Provision is made in the slave units to forward to the master unit indication as to whether the information displayed on the respective slave units is acceptable or not. Indication of the acceptance of the information at a particular slave site may automatically effect a print-out of that information, for example, in the form of a label. The master unit includes various electronic logic features providing for example a facility for correcting improperly-entered data and locking out the entry of further data following completion of a desired data entry.

11 Claims, 3 Drawing Figures

SYSTEM FOR COORDINATION AND DOCUMENTATION OF MATERIAL HANDLING

BACKGROUND OF THE INVENTION

This invention relates to the coordination and documentation of the movement (flow) of goods or materials from one point to another, and more particularly to an electronic data communicating arrangement for overseeing this material handling and providing confirmation of, for example, the material expected to be received and the actual receipt thereof and making a permanent recordation thereof. The invention is useful for instance in inventory control situations and the movement of bulk pharmaceuticals.

Most systems in this field are computerized to some degree. The required proper information is put into the computer and the computer in turn effects the display of the information. The displayed information is characteristically updated when new control information is supplied to the computer.

Other systems employ straight "intercom" arrangements, telephones and various sonic and visual indicators, as varied as are the types of data and materials handled in industry.

Indeed, if the communications are to be provided via a computer, investments in time and money are considerable, particularly when one considers the purchase of the initial equipments, improvement updates, and that the system must be programmed. Traind people are necessary to operate and program the equipment. Likewise, maintenance must be done by trained personnel. The two-way communication itself is likely to involve expensive equipment.

Those systems utilizing intercoms, telephones, sonic indicators and the like have no memory and are totally inadequate in certain areas such as high noise environments.

The present invention, unlike the art described above contemplates an inexpensive arrangement, not requiring the complexity of a computerized operation, but yet does not fall prey to the shortcomings and drawbacks above-mentioned Such is the principal objective of this invention.

SUMMARY OF THE INVENTION

According to the broader aspects of this invention there is provided a system for coordinating and documenting the handling of material between a first site and at least a second site remote therefrom, comprising:

a. a master data communicating unit associated with the first site, said master unit including data entry means, memory means for storing entered data and display means for indicating system status and displaying the data entered in said memory means; and b. a slave unit associated with the second site, said slave unit being operatively connected to said master unit and including means for displaying data entered into said master unit, means for indicating confirmation/non-confirmation of the data displayed by said slave unit display means and means for effecting a permanent record of the data displayed by said slave unit display means and also the output of said confirmation/non-confirmation indicating means, whereby data entered in the master unit is simultaneously displayed by the respective display means of said master and slave units and confirmation/non-confirmation of said entered data is displayed by both units.

This invention has particular application as an inventory control arrangement between two or more areas remote from one another. It is comprised of a data communication facility. A plurality of areas are kept informed of data comprising any reasonable number of symbols or digits. The data could, for example, take the form of alphanumeric characters.

The system comprises a master (central) station, where information is entered, and at least one slave (remote) station. Both the master and slave units employ a suitable display and so-called "hold" indicators, "confirm" indicators and "non-confirm" indicators. The master unit has an appropriate keyboard for entering the information. The information entered at the master unit is automatically displayed at the appropriate slave unit(s). It is contemplated that the operator at the slave unit(s) would review this information with that previously provided at the slave station, for example, in the form of a work-sheet, in order to confirm the information entered at the master.

At the outset, and initiate key at the master is actuated, which illuminates the "hold" indicators and prepares the system to receive data. This data, once entered may be acknowledged from the slave(s). Such is done by actuating the confirm key(s) thereof. Should the information not correlate with the information already provided (or otherwise available) at the slave location(s), the non-confirm key would be actuated, which in turn informs the operator at the master station inter alia to maintain the operation in a "hold" condition.

The information entered into the system is secured from tampering and can only be changed at the master station. This is so because the master equipment includes a programmable lock provided to prevent, for example, unauthorized people from changing the displayed information.

Should a mistake be made while entering the data in any one or more of the digits save the last digit, there is provided in the master unit provision for retraction of the incorrect data. A retraction key is provided which may be actuated and the proper information then entered. It is to be noted that this feature would not apply to the final digit to be entered into the display. This is so in order to prevent the operator from being able to "back into the system" by means of the retract key, thus defeating the lock mechanism. In accordance with the invention the system is able to lock out all signals except "initialize" after the Nth, i.e. final, digit of information is entered.

It is to be noted that once the initial equipment is installed, no updates are required and no programming needed (except the lock code), in contrast to the computerized systems alluded to in the foregoing. Moreover, operators of equipment incoporating the present invention may be trained in a bare minimum of time. Also, due to the reduced complexity of such equipment, maintenance is greatly simplified. Very important, too, this invention enables inventory and materials flow control in the most adverse types of environments, including for example high electrical noise situations and wide temperature variations.

Although this invention is entirely capable of providing full communication of alphanumeric and other symbols between at least two locations and involving any reasonable number of slave stations, the detailed description herein provided is generally restricted by way of example to numeric representations and a single master/slave operation.

A highly significant feature of this invention is that both the master and slave units may be coupled to suitable printing facilities, wherein information corresponding to that entered into the digital displays may be printed out as a permanent record and/or label at either or both locations.

BRIEF DESCRIPTION OF THE DRAWINGS

The invention will be described in greater detail hereinafter with reference to the accompanying drawings wherein.

DESCRIPTION OF THE PREFERRED EMBODIMENT(S)

Figure 1:
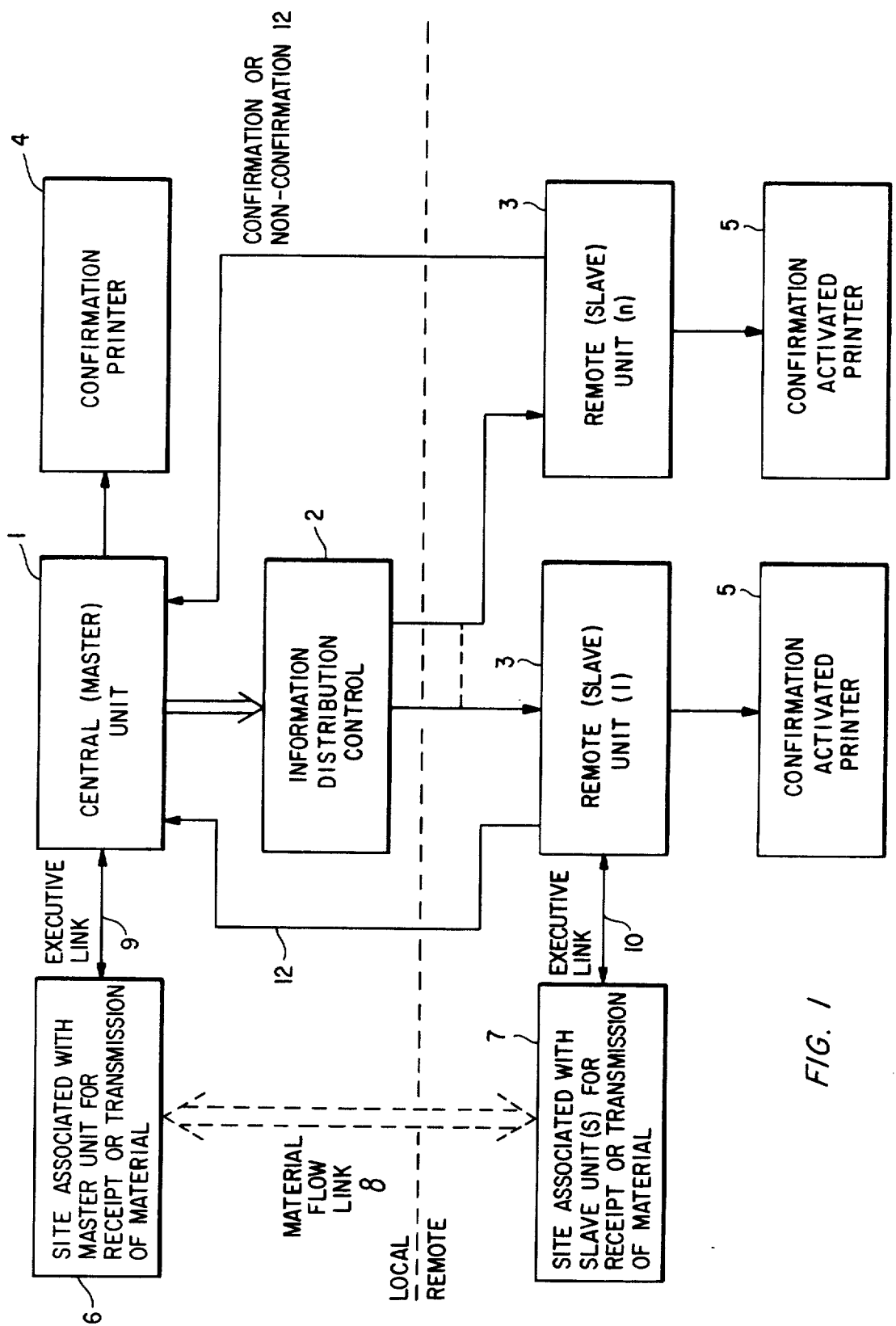
FIG. 1 is a system block diagram illustrating the data communications and materials flow between the sites associated respectively with the master and slave units.
Figure 2:
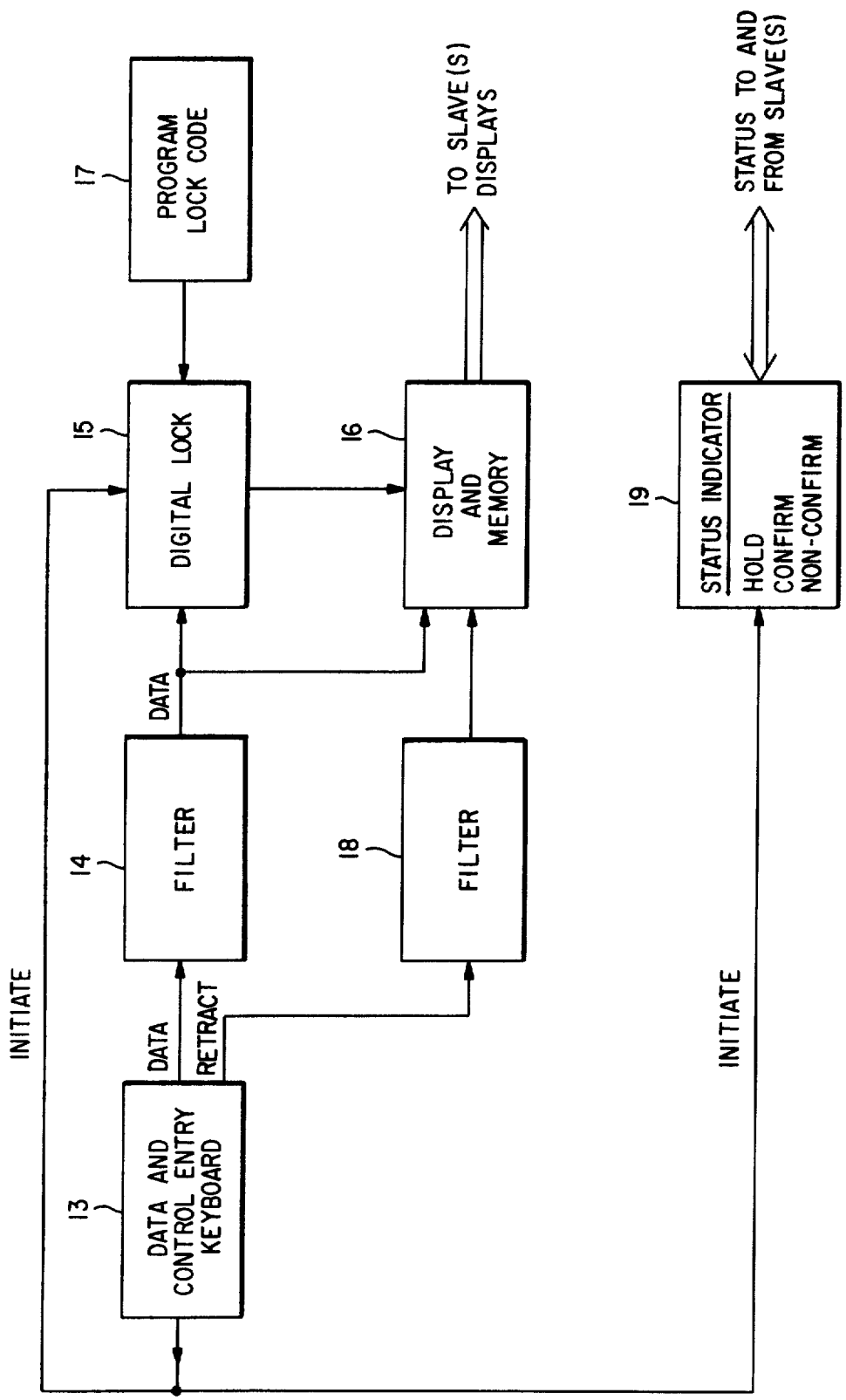
FIG. 2 is a block diagram illustrating the electronic arrangement of the master data communicator unit.
Figure 3:
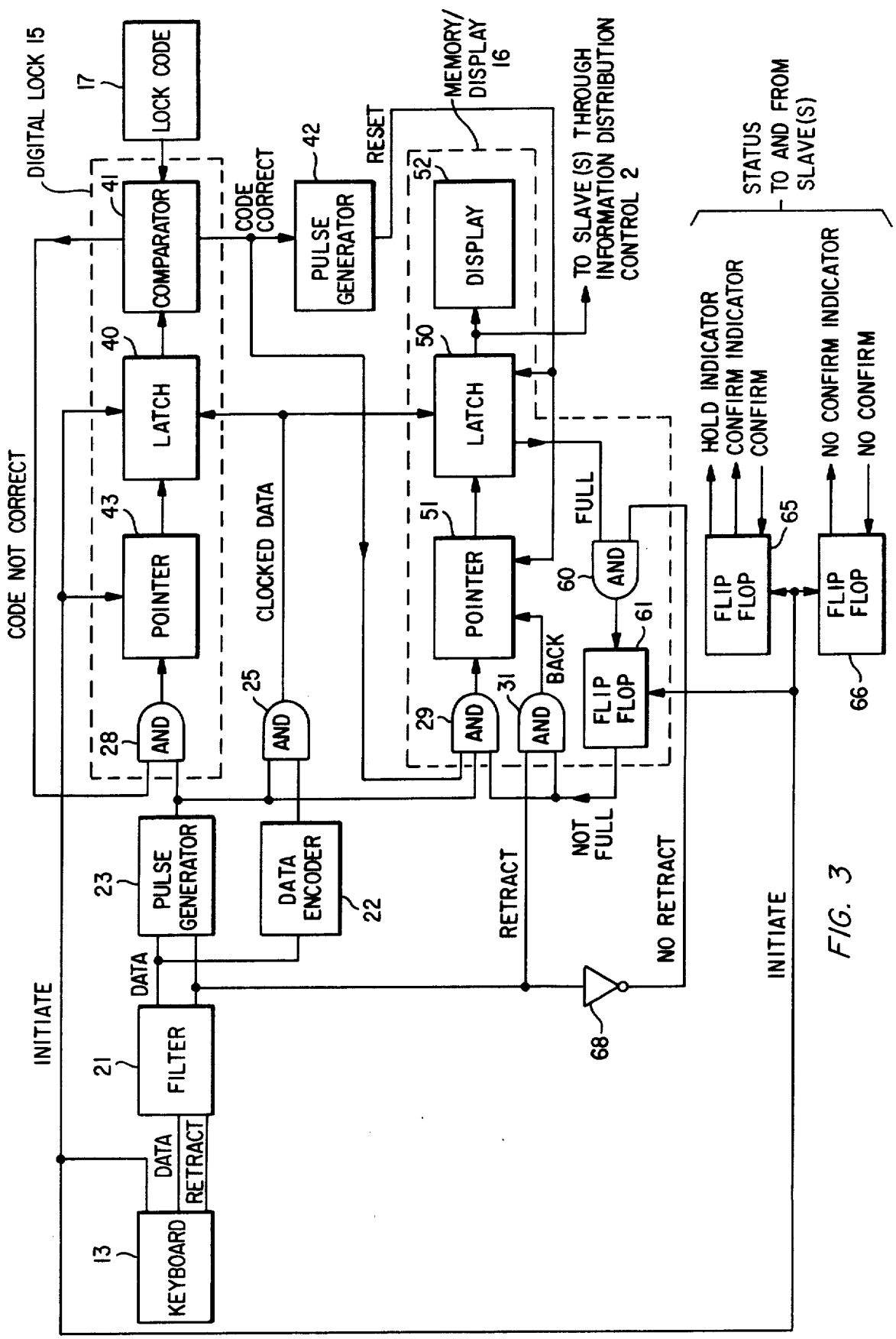
FIG. 3 is a schematic diagram illustrating more particularly the electronics of the master station, depicted in FIG. 2 and showing interconnections with the slave units.

Referring to FIG. 1, there is illustrated a central (master) station 1 having a master data communicating unit comprising the circuitry illustrated in FIGS. 2 and 3. The master unit is connected to an information distribution control arrangement 2, wherein information entered into the master unit is distributed by the master unit operator as desired to any one or more of n number of remote (slave) stations 3 each having a slave unit. The master unit is coupled to a printing device 4, hereinafter also referred to as a confirmation printer. Likewise, each slave unit is coupled respectively to a printing device 5, which is sometimes referred to hereinafter as a confirmation signal actuated printer. Printer(s) 6 may typically take the form of a label printer under the control of the respective slave units.

As illustrated in FIG. 1, the master unit 1 is associated with a site from which or to which materials may be transmitted or received, relative to a remote site associated with a slave unit. For purposes of ease of understanding, the site associated with the master unit 1 is designated in FIG. 1 as block 6 and, further, is illustrated as being remote from the site associated with the slave unit by a dashed line in FIG. 1 separating the master station area from the slave station area(s). In FIG. 1, site 6 is shown as being connected to the master unit by an executive link 9, which may take the form of an actual communications link, or may instead take the form of an optical (visual) or human communication link.

Similarly, there is site 7 associated with each slave unit (only one shown) for the transmission or receipt of materials to or from the site 6 associated with the master unit. This slave site 7 is shown to be inter-related to the site 6 by a materials flow link 8 which is intended to represent any suitable means by which materials may flow from one to the other of sites 6 and 7. An executive link 10 is shown between the remote unit 3 and the site 7.

In particular regard to the information distribution control arrangement 2, it is to be noted that this may take the form of any suitable conventional means for coupling the information from the central station unit 1 to any one or more of the slave units 3, such as a patch panel or its electronic equivalent. By control arrangement 2, the operator at the master station is able to provide any one or more of the slave stations with the (or merely portions of the) information entered into the master unit on a "need-to-know" basis.

In FIG. 1, the communication link between the master and slave units is completed by the confirm/non-confirm lines, wherein, as mentioned above, the slave station operator is able to inform the master station operator whether or not the information provided from the master unit is "acceptable".

The system of FIG. 1 will now be described in connection with a number of examples of uses to which the invention can be put.

In a typical type of inventory control situation, a desire is expressed (usually by a customer) in one form or another to purchase or otherwise acquire a particular article or substance. An operator/clerk at the master station communicating with the customer would learn the nature of the desired item, and proceed to index that item through his records for a code identification established for that article, which code would include the slave station or location where the article may be found. The operator would then enter the code into the master unit (after he has entered the correct lock code, thus enabling the equipment to be unlocked to receive code data). The complete code to be transmitted to the slave station, could, of course, include how many units of the article or substance are desired, where the same is to be sent, the account number of the purchaser etc.

The moment this code is entered into the master station a corresponding message or code is automatically displayed at the appropriate slave station(s) as well as the master station. In this example, one slave station may be the actual warehouse or other type of location at which the desired article(s) are situated and another slave station may take the form of an accounts or credit verification facility. The operator at the slave station associated with the acutal location of the articles would check the information displayed with his records to determine whether the desired kind and quantity of article is available. If available, the operator would actuate the confirm key on his slave unit, which automatically causes this condition to be displayed at the master unit (and also the particular slave unit). This information may also be printed out on the printing device associated with the slave unit and/or the master unit.

By this acknowledgment from the slave unit, the operator at the master unit is informed that from the standpoint of article availability, the transaction may be completed.

By way of the information distribution control arrangement 2, the total information entered at the master unit may be divided up, with respective portions thereof sent to the various pertinent slave stations. For example, only that portion of the information entered relating to the identity and quantity of the desired article need be transmitted to the slave unit associated with the physical location thereof. On the other hand, only the portion of the information entered which relates to the purchaser and his account number would be transmitted to the slave location relating to accounts confirmation etc.

This latter slave station would inform the master unit, by way of the confirm/non-confirm key, whether or not for example a credit purchase would be acceptable. Thus, in this case, the operator at the master location would await confirmation from both of these slave stations before proceeding. Assuming that confirmation has been received from both slave locations, this information along with the remainder of the necessary information associated with the purchase could be printed out on the confirmation printer at the master station; this print out may actually constitute an invoice of the transaction.

Should a non-confirm condition be transmitted from the article location slave unit to the master unit, indicating that the desired article or quantity thereof is not available, this would, of course, enable the operator at the master station to explore the possibilities of an alternate article request. Likewise, should a non-confirm condition be received from the accounts confirmation section, the operator at the master site may take appropriate action such as requesting a cash payment.

Another example of use of the present invention, and quite apart from the inventory control example described above, involves a bulk material flow control situation in a pharmaceutical production environment. For example, a batch of granulation is identified usually by lot and run number and is dispensed from a first location, usually via one or more flow conduits, to a second location wherein the material is processed, such as into tablets or capsules. Preliminarily, a determination is made, and a schedule made up, that a particular material in question is to flow from a first (master) location (e.g. a hopper) associated with the master unit to a particular slave location which may be associated with a tablet press, and to which is associated a slave unit. The schedule is made available to operators at both the master and slave locations, usually at the beginning of the work shift.

The operator at the master location, when ready to begin sending the material to the scheduled slave location, enters inter alia the lot and run number of the material into the master unit. This information is automatically received and displayed by the slave unit, and the operator at this location compares the information entered against his schedule to ascertain whether the scheduled information agrees with that now being displayed by the slave unit. If not, the slave station operator would actuate the non-confirm key which would in turn automatically inform the operator at the master location to maintain the system in a "hold" condition.

Assuming that the information does agree, the operator of the slave unit would actuate the confirm key, which illuminates a "confirm" indicator at the master station and informs the operator that the slave location is ready to receive the material identified and to commence dispensing said material to the slave location. Moreover, actuation of the confirm key at the slave location enables the printer (if any) associated with that slave unit. In so doing a print out could be made of the entire communication. Alternatively or in addition thereto, actuation of the confirm key would ultimately commence the printing of labels which include the particular information entered in the display of the slave unit.

This second example particularly illustrates the importance of the master station operator being comfortably sure of the existence or occurrence of certain things at or in association with the slave station. For example, it is important that the operator at the master station know that the slave site is ready and able to receive the material, and that the slave site knows what to expect and when to expect it. Also, the master site operator would want to be reasonably sure that the information transmitted to the slave station is free from outside interferences and/or the operator at the slave site has indeed received the information.

Moreover, there are very important considerations to be made in regard to the operator at the slave site. For example, it is important that the slave site operator know when the material is to be sent from the master site and to be able to inform the master site operator when the slave site is ready to receive the material. Moreover, it is important to convey whether or not the material is or was in fact received satisfactorily and to inform the master site of any changed conditions which would require an interruption of the flow of material. Provision is made in the instant invention for each of these safeguards.

Another example of use of the present invention (related somewhat to the above-described second example) involves situations where the flow of material initiated from the master site is forwarded to a first slave site, to be then further forwarded to its ultimate destination at a second slave site. In such a case, the information distribution control arrangement 2 at the master site enables an appropriate masking of the data entered in the master equipment to particularly inform the operators at the respective slave sites of the forthcoming material including such particulars as what is to be expected, when and from where. For example, the information provided the first slave site would enable the operator thereat to confirm the information transmitted, including the ultimate destination. Moreover, the operator of the first slave site would be able to confirm the receipt and forwarding of the material to the second slave site. The operator of the second slave site on the other hand, also would be able to confirm from the information provided that the material expected is the correct material; confirmation of the receipt of said material may also be conveyed back to the master site. In this way, forwarding of the material from the master site would not be initiated until confirmation is received from both slave sites that the information entered into the system at the master site is correct according to the schedules provided the operators at both slave sites.

In such an arrangement as described in the immediate above, it may be easily seen that the invention has within its scope the capability of following the handling of a particular material through several steps or points to its ultimate destination and/or form as related at the final slave station. For example, the raw material may be forwarded from a first site associated with the master station to the first slave station. As the material is received one or more operations may be performed thereon prior to the material being forwarded to a second slave site, and so on until the material is eventually received by the final slave site at which the final operation(s) are effected. Receipt of the material and completion of the handling are individually transmitted to the master site for each slave station. In such a system, it will be appreciated that an operator at the master site may, merely by observing the confirmation indicators on the master unit, be able to ascertain at what stage in the handling of the material that particular job is at. This, of course, would enable a more efficient scheduling of potentially overlapping and continued operations.

Referring to FIG. 2 there is illustrated therein an example logic block diagram of the control station master unit and so much of the interconnections with the slave unit(s) as is necessary for a proper understanding of the invention. Referring to FIG. 2, the arrangement includes a data and control entry keyboard 13 by which an operator may enter the desired information into the master data communicator unit. The keyboard 13 is connected on the one hand to filters 14 and 18 (which in actuality may be a single filter arrangement in place of the dual filter arrangement shown) and on the other hand to a digital lock arrangement 15. The line connecting keyboard 13 and filter 14 constitutes the data line, relating to all the information keys of keyboard 13. The line connecting keyboard 13 and filter 18 constitutes a control line associated for example with the so-called retract key of keyboard 13, and by which the operator may retract previously entered data and enter in place thereof the correct information.

The line connecting keyboard 13 to the digital lock arrangement 15 constitutes a control (initiate) line, by which the lock 15 is informed of an impending multi-digit code (e.g. three digits) being introduced via keyboard 13, which code if correct would cause digital lock 15 to "unlock" the unit for the receipt of data. The initiate line from the keyboard 13 also connects to a status indicator 19 associated with the master unit. Whenever, the initiate key of keyboard 13 is actuated, indicator 19 displays a "hold" status. The status of the master as represented by indicator 19 is also automatically forwarded to each slave station unit.

The information output of filter 14 is connected on the one hand to the digital lock 15 and on the other hand to a display and memory arrangement 16. The output of filter 18 representing the retract signal from the keyboard 13 is connected to the display and memory arrangement 16.

The digital lock 15 has associated therewith a program lock code block 17. Digital lock 15 is also connected to the display and memory 16. The outputs of display and memory arrangement 16 are forwarded to the various slave stations (through the information distribution control 2 of FIG. 1). The means by which the information present at blocks 16 and 19 is conveyed to the slave station unit may take any suitable and conventional form, including individual lines run between the master station unit and each slave for each digit of the master/slave displays.

The arrangement depicted in FIG. 2 is further amplified in FIG. 3. Referring thereto, the keyboard 13 outputs of "data" and "retract" are shown connected to a dual filter arrangement 21. The data output of filter 21 is connected to a pulse generator 23 and also to a data encoder 22. Generator 23 may simply take the form of a one shot. The output thereof, as illustrated in this example, is used primarily as a strobe type output for common control of the functions of the digital lock 15 circuitry (which in FIG. 3 is comprised of And gate 28, pointer arrangement 43, latch [memory] arrangement 40 and comparator 41) and the display/memory arrangement 16 (which in FIG. 3 is comprised of And gate 29, pointer arrangement 51, latch [memory] 50 and display 52).

In the case of purely numerical operations, for example, the data encoder 22 could take the form of a conventional decimal to BCD converter.

The output of encoder 22 is gated in And gate 25 via the pulse generator 23 output to derive clocked data which is fed to both latch (memory) 40 and latch (memory) 50 respectively of the digital lock 15 and display/memory 16 sections of the master data communicator unit.

The "strobe" of pulse generator 23 is connected to And gates 28 and 29 (as well as And gate 25). And gate 28 is in turn connected to pointer arrangement 43 and the output thereof connected to latch 40. Latch 40 is connected to comparator 41, as is the program lock code arrangement 17. This latter block may typically be comprised of a series of thumbwheel switches. Comparator 41 has a feedback line ("code not correct") to And gate 28 intended to inhibit the lock 15 from receiving any further data in the absence of a proper code from the keyboard 13.

And gate 29 receives in addition to the output of generator 23 the comparator 41 output indicating the correct code has been entered into the digital lock 15. And gate 29 also receives the output of a flip-flop 61 indicating the memory 16 is not full. And gate 29 is connected to pointer arrangement 51 which in turn is connected to latch 50. Latch 50 is allowed to receive data via gate 25 if the "code correct" output from comparator 41 is present at And gate 29. The data output lines of latch 50 are connected on the one hand to a conventional display arrangement 52 and on the other hand to the slave station unit(s) via the information distribution control 2.

Latch 50 also has connected thereto as a reset input, the output of pulse generator (one shot) 42. The latter generates an output in the presence of a "code correct" signal appearing at its input from comparator 41. This output of generator 42 is also connected to pointer arrangement 51.

Latch 50 has a second output, i.e. a "full" line leading to an And gate 60. The other input to gate 60, i.e. a "no-retract" input, is derived from the retract signal output of filter 21, as processed through an inverter 68. The output of And gate 60 is connected to a flip-flop 61 which in turn has its output connected to And gates 29 and 31. This output, which is indicative of the fact that data entry into latch 50 is not yet complete (i.e. the memory 50 is not yet filled), enables pointer arrangement 51 to continue to respond to the entry or retraction of data until the memory 50 becomes filled. Flip-flop 61 is reset via the appearance of an initiate signal from keyboard 13. This initiate signal is also connected to an additional pair of flip-flops, i.e. FF's 65 and 66, which in turn are interconnected with the slave station units. FF 65, for example, is associated with the local (master) and remote (slave) display involving the conditions of "hold" and "confirm". FF 66 is associated with the local (master) and remote (slave) display involving the condition of "no confirm".

In reference to FIGS. 2 and 3, the operator keyboard 13 provides not only a means by which the operator may enter information into the system, but also provides certain information entry controls, such as for example the initiate key which initializes the equipment, and the retract key which enables the operator to withdraw incorrect information and re-enter the information correctly.

Signals from the keyboard are filtered, except for the initiate signal. The initiate signal initializes the various stages of the master unit. The first several digits (three digits in the present example embodiment) of data entered from the keyboard are converted or encoded and passed to the digital lock arrangement 15. If those digits, i.e. the entry code digits, match the lock code in 17, the memory and display arrangement 16 is enabled. Thereby, upon further operation of the keyboard, the output signals therefrom are stored in the memory 16 (in particular latch 50) and displayed (via display 52), as well as sent to the slave station units. If a mistake made in the entry of information into 16 is discovered, it may be retracted by operation of the retract key of the keyboard and new data may then be entered to replace it.

Operation of the initiate key illuminates the "hold" indicator (associated with FF 65) of the status indicator 19 in both master and slave units. Confirmation (or non-confirmation as the case may be) from the slave station(s) regarding the completed data entered at the master unit is also indicated in the status indicator 19 (associated with FF's 65 and 66).

With particular regard to the locking mechanism, built into the display and memory arrangement 16, the same is triggered by the entry of the final (Nth) digit entered from the keyboard 13. This is accomplished as follows. The entry of the last digit serves to lock arrangement 16 via an inhibit loop consisting of And gate 60, FF 61, And gate 29 and Pointer circuit 51. The retract signal is also inhibited via And gate 60, FF 61 and And gate 31. This prevents entry into the system by any means other than the initiate signal.

Referring more particlarly to FIG. 3, the initial code digits of information entered pass through filter 21 and are converted by unit 22 and fed through And gate 25 into the digital lock mechanism 15, where they are entered into the latch memory 40. The data entered into latch memory 40 is compared in a comparator 41 with the information entered into the code (thumbwheel) switches 17 of digital lock arrangement 15.

Assuming that a code match exists, an output ("code correct") is rendered from the comparator 41 which will enable the display/memory 16. This signal is passed to the display memory 16 via And gate 29. It should be pointed out that when the match is effected in comparator 41 and the "code correct" output signal indicating same is generated, this signal activates pulse generator 42, which automatically clears the previous entry in the latch memory 50 of display memory 16. The input to the display/memory 16 through And gate 29 is passed through a pointer arrangement 51 to the latch memory 50, and as stated above the contents of memory 50 are also displayed via a display unit 52 and automatically passed on to the slave station unit(s) via the information distribution control arrangement 2 (FIG. 1).

When the complete information is entered into memory 50 of display/memory 16, i.e. when the memory is full, an output signal from the memory is effected and passed to And gate 60 which in turn sets flip-flop 61. The output from flip-flop 61 constitutes one input to And gate 29 which disables the further entry of information into the latch circuit 50. The output of flip-flop 61 also disables And gate 31, thus preventing the retract control from affecting the data entry into display memory 16.

Assuming that the operator at a slave station involved has confirmed the information entered into the display at the slave station (via the master unit) as being correct, and has indicated same by actuating the "confirm" key or button, this provides a signal sent back to the master unit which is received by flip-flop circuit 65, which then updates the status indicator to a confirm condition. Assuming that the information entered did not correlate with that of the schedule of the operator at the slave site, the non-confirm key would be actuated, which in turn would be received at the master unit and entered into flip-flop 66, which similarly would update the status indicator of the master unit to reflect a non-confirm condition.

In FIG. 3, pointers 43 and 51 provide a means for indicating at what position in the total data stream a particular digit is stored in latches 40 and 50 respectively.

Pulse generator 23 provides the clocking for the master unit. The output of 23 enables the actual storing of the information in latches 40 and 50, and also advances the pointers 43 and 51 accordingly. Similarly, when the retract key is actuated, the output of generator 23 enables the information entered at a particular latch position to be withdrawn and the pointer associated with that latch to move back accordingly.

In the system according to the invention the data entered at the master station is able to be displayed continuously on the master unit, and those portions of that data sent to respective slave station units are also continuously available for display on the slave units. Moreover, confirmation of the data entered may be displayed continuously. Thus, for example, upon a shift change, the materials transfer situation between master and slave sites is immediately known merely by a glance at the particular station unit(s).

Receipt and display of the confirm signal at the master unit serves to place the master site in readiness for the intended materials transfer, and informs that the slave site is ready to act upon whatever the master site is to do or requires.

What is claimed is:

1. System for coordinating and documenting the handling of material between a first site and at least a second site remote therefrom, comprising:
   a. a master data communicating unit associated with the first site, said master unit including data entry means, memory means for storing entered data and display means for indicating system status and displaying the data entered in said memory means; and
   b. a slave unit associated with the second site, said slave unit being operatively connected to said master unit and including means for displaying data entered into said master unit, means for indicating confirmation/non-confirmation of the data displayed by said slave unit display means and means for effecting a permanent record of the data displayed by said slave unit display means and also the output of said confirmation/non-confirmation indicating means,
      whereby data entered in the master unit is simultaneously displayed by the respective display means of said master and slave units and confirmation/non-confirmation of said entered data is displayed by both units.

2. A system according to claim 1 comprising a plurality of slave units each associated with a respective site remote from the first site, and further including information distribution control means connected between said master unit and said plurality of slave units for enabling the data entered into said master unit to be distributed, in whole or in part, to respective ones of said slave units, as desired.

3. A system according to claim 2 further including means, located at the first site for effecting a permanent record of the data entered into said master unit, said permanent record including on the one hand an indication of which portions of said entered data are sent to the respective slave units, and on the other hand the system status in respect to each slave unit.

4. A system according to claim 1 wherein said master unit includes programmable entry lock means for enabling the entry of data into the the system only upon there being effected the preliminary entry of a predetermined multi-character code.

5. A system according to claim 4 wherein said entry lock means is connected to said memory means such that upon the entry of said multi-character code said memory means is enabled to receive data.

6. A system according to claim 4 wherein said memory means includes access lock-out means for preventing the alteration of data entered into said memory means following completion of said data entry.

7. A system according to claim 6 further including retract means for enabling incorrect data entered into said memory means to be withdrawn and substituted by correct data subject to said access lock-out means.

8. A system according to claim 2 wherein said master unit further includes means for informing the slave units of an imminent change of data displayed on the slave units.

9. A system according to claim 6 wherein said master unit further includes means for informing said slave units when a data entry at the master unit is complete.

10. A system according to claim 2 wherein said means for effecting a permanent record at a slave site includes means for printing at least one label which automatically has incorporated therein information derived from the data displayed by that slave unit.

11. A system according to claim 10 wherein for each slave unit the print-out of the information is automatically effected at the slave site associated therewith and/or the master site upon a confirm condition being forwarded from that slave unit to the master unit.

* * * * *